United States Patent [19]
Buck et al.
[11] 3,776,769
[45] Dec. 4, 1973

[54] METALLISING PASTES

[75] Inventors: Raymond Herbert Buck, Newbury; Harry Campbell Barlow, Basingstoke, both of England

[73] Assignee: United Kingdom Atomic Energy Authority, London, England

[22] Filed: Aug. 2, 1971

[21] Appl. No.: 168,466

[30] Foreign Application Priority Data
Aug. 27, 1970 Great Britain .................. 41,275/70

[52] U.S. Cl. ............. 117/212, 117/227, 117/123 B, 106/1, 252/514, 252/518
[51] Int. Cl. ............................ B44d 1/18, C09d 5/24
[58] Field of Search ............................ 252/514, 518; 117/212, 227, 62, 160 R, 123 B; 106/1

[56] References Cited

UNITED STATES PATENTS

| | | | |
|---|---|---|---|
| 3,450,545 | 6/1969 | Ballard et al. | 106/1 |
| 3,679,473 | 7/1972 | Blatchford et al. | 252/514 X |
| 3,324,049 | 6/1967 | Holmes | 252/514 |
| 3,440,182 | 4/1969 | Hoffman | 117/227 X |
| 2,837,487 | 6/1958 | Huttar | 252/514 |
| 3,293,501 | 12/1966 | Martin | 252/514 X |
| 3,620,840 | 11/1971 | Schroeder | 117/227 |

FOREIGN PATENTS OR APPLICATIONS

| | |
|---|---|
| 739,543 | Great Britain |

*Primary Examiner*—Charles E. Van Horn
*Attorney*—Larson, Taylor & Hinds

[57] ABSTRACT

A metallising paste for screen-printing microcircuitry comprises a heat-vaporizable inert liquid medium containing, in powder form, at least one constituent selected from a noble metal, a noble metal alloy, an oxide of a noble metal and an oxide of a noble metal alloy, at least one constituent selected from copper and copper oxide, and a vitreous binder, the binder having a fusion temperature less than the melting temperature of the noble metal - copper oxide alloy formed on fusing the powder constituents of the paste. The noble metal is usually Ag or Au and the noble metal alloy a Ag-Au alloy.

6 Claims, No Drawings

METALLISING PASTES

BACKGROUND OF THE INVENTION

This invention relates to metallising pastes suitable for screen printing microcircuit replicas onto ceramic substrates which replicas, after firing, form electrically conducting elements which are highly adherent to the substrates.

There are numerous metallising compositions available which, in paste form, are used to produce electronic circuits by screen-printing techniques but, after firing, these compositions form conducting elements generally exhibiting relatively low adhesion to ceramic substrates.

For example the problem of adhesion is recognized in U.K. Specification No. 1,144,930 which, with U.K. Specification No. 1,004,653, relates to metallising compositions containing alloys of the noble metals, in lieu of those containing unalloyed gold or silver. The compositions theredisclosed, for use with prefired ceramic substrates to form electrical elements thereon, contain powdered vitreous binder, finely divided noble metal alloy particles and an inert vehicle, the purpose of the vitreous binder being to secure the noble metal particles to a ceramic substrate for which purpose a firing temperature must be used which causes the vitreous binder to melt and wet the ceramic substrate. It is said that, in noble metal metallising compositions generally, higher adhesion can be obtained with higher firing temperatures but that when temperatures equal to or in excess of the melting point of the noble metal particles are used for firing, the metal particles spheroidise into globules forming non-continuous fired-on elements and hence defective electrical conductors: hence to avoid the formation of metal globules, metallising compositions containing the more abundant and less expensive noble metals, gold and silver, melting at 1,063° and 960° C respectively, must contain vitreous binders which melt below these temperatures and yield elements with only moderate adhesion at the allowable firing temperatures. For higher firing temperatures eg over 1,200° C metallising compositions have necessarily been composed of metal powders of Pt, Pd and other expensive high melting noble metals and the aforementioned Specifications disclose the elaborate use of noble metal alloys i.e. Pd-Ag, Pd-Au, Pt-Au, Ag-Au, Ag-Pt, Pd-Pt to provide a series of metallising compositions, the compositions being suitable for use over a range of temperatures.

U.K. Specification No. 739,543 discloses a method of joining ceramic articles to one another or to metal articles to yield joints of high strength. The method comprises applying a mixture of powdered silver oxide and/or silver and copper oxide and/or copper between the articles and then melting the mixture in a non-reducing atmosphere e.g. air by heating to a temperature exceeding 945° C. The high strength of the joints subsequently obtained on cooling, achieved through high adhesion, is said to be due to the strong wetting action of the copper oxide or of the Ag-$Cu_2O$ alloy produced. It has now been discovered that when copper oxide is used with silver or gold, for example, in metallising compositions including a vitreous binder a pronounced increase in the adhesive strength of fired-on elements can be obtained when such compositions are fired at temperatures at or exceeding the melting point of the metal phase and, unexpectedly, it has been found that the metal particles do not spheroidise at these temperatures and, surprisingly, that the presence of the fused binder does not insulate the metal phase or particles thereof and impede its wetting action as might be expected. In metallising compositions generally the firing temperature is controlled at that which allows the sintering together only of the noble metal component and the adhesive strength is essentially provided by the vitreous phase alone. However, and contrary to the teaching in Specification No. 1,144,930, it is apparent that conducting elements having continuity, as well as high adhesion, can be obtained from compositions fired at temperatures exceeding the melting temperature of the metal phase, if those compositions have copper oxide therein.

Furthermore high adhesive values can be realized by firing Ag or Au based compositions in air at conventional firing temperatures ie generally not exceeding 1,100° C, and do not require to be realized by firing at the higher temperatues, over 1,200° C, needed for the high-firing high-cost metallising compositions of the prior art, at least some of which require to be fired in vacuo.

SUMMARY OF THE INVENTION

The present invention provides a metallising paste comprising a heat-vaporizable inert liquid medium containing in powder form, at least one constituent selected from the group consisting of a noble metal, an alloy of a noble metal, an oxide of a noble metal and an oxide of a noble metal alloy, at least one constituent selected from the group consisting of copper and copper oxide, and a vitreous binder, said binder having a fusion temperature less than the melting temperature of the noble metal-copper oxide alloy formed on fusing the powder constituents of the paste.

The noble metal may be Ag or Au and the noble metal alloy a Ag-Au alloy. In this Specification the term noble metal means a metal of the group Ru, Rh, Pd, Os, Ir, Pt, Au and Ag.

The invention also provides a method for forming an electrically conducting element on a ceramic substrate comprising forming a replica of said element on said substrate using a metallising paste as afore-stated, drying the formed replica, firing the dried replica in a non-reducing atmosphere — which may be air — at a temperature not less than the melting temperature of the noble metal-copper oxide alloy and solidifying the fired replica to form said conducting element. The replica may be formed by screen-printing. It is preferred to fire the dried replica at a temperature not less than the melting temperature of the noble metal constituent.

In addition the invention provides a ceramic substrate having an electrically conducting element formed thereon by the method of the present invention.

DESCRIPTION OF THE PREFERRED EMBODIMENTS

The nature of the present invention is explained in further detail and by way of example as follows.

A metallising paste was made by mixing silver oxide, cuprous oxide and a vitreous binder with a heat-vaporizable inert liquid medium. The paste contained these materials in the following amounts: silver oxide 11.25 gms, cuprous oxide 12.50 gms, vitreous binder 1.25 gms, liquid medium 8.60 gms.

The paste was printed through a stencilled screen onto a ceramic substrate to form a replica of the screen pattern on the substrate, a typical screen pattern corresponding to a series of electrical conductors forming a microcircuit. After screen-printing the microcircuit replica, the replica was dried and then fired in air.

Firing temperatures are preferably determined by the MP's of the noble metal components. For Ag — as in the present example — having a MP of 960° C, a suitable temperature is 1,000° C and for Au, having a MP of 1,063° C, a suitable temperature is 1,100° C. For Ag-Au alloys, and oxides of Ag, Au and the alloys thereof suitable temperatures are similarly above the respective melting temperatures. Suitable vitreous binders for use in Ag/$Cu_2O$ or Au/$Cu_2O$ metallising pastes, and having a fusion temperatue less than that of the noble metal-copper oxide alloy, are Owens-Illinois glass No. 01328 or Ramsden glass No. F420: these are glass frits passing through 325 mesh. A suitable inert liquid medium is that known as Blythe No. 485 (supplied by Blythe Colour Works Ltd.): during the drying and initial firing the liquid medium evaporates off. A suitable ceramic substrate material for use with the metallising paste of the invention is alumina. At the firing temperature the noble metal-$Cu_2O$ alloy formed is present in the molten state and is in contact with and wetting the substrate surface. It is believed that, on initial cooling, the noble metal phase solidifies as a continuous conducting entity and that this solidified entity, adhering to the substrate, is "frozen" thereto with further cooling when the vitreous phase solidifies. Accordingly it is believed that melting the noble metal phase, contrary to prior art practice, in carrying out the present invention, is essential to the development of high adhesion and conductivity.

Metallising pastes according to the invention can vary in composition over a wide range. Pastes can contain as little as 1 percent $Cu_2O$ and as much as 75 percent $Cu_2O$ (66.6 percent copper). Low glass binder contents, up to about 5 percent, facilitate brazing of metal current leads onto pre-formed conducting elements but strong joints have been obtained with binder contents above 30 percent. For conductors having the best appearance ie bright metallic the $Cu_2O$ (or Cu) content should not exceed ~ 50 percent and the binder content should be below 10 percent.

The need for the present metallising paste arises in particular in the fabrication of microcircuits where patterns of electrical conductors and resistors are produced by screen-printing and firing but it has general application to electronic circuitry where screen-printed conducting elements are applied to ceramic substrates and are required to have high adhesion. In order to connect, electrically and mechanically, microcircuit conducting elements of one substrate to those of one or more other substrates it is necessary to affix strong metal leads to screen printed and fired connecting pads formed on the periphery of each substrate and forming part of the microcircuitry: to ensure that these leads are mechanically secure the fired connecting pads must have high adhesion to the substrate. Moreover the fired pads should not be degraded by joining processes ie by soldering or brazing. Suitable braze materials for use with the connecting pads include Au and Ag or Au-Ag alloys.

In one example gold-plated Kovar (Reg TM) leads were brazed onto the connecting pads of a pre-printed and fired Ag-$Cu_2O$ micro-circuit, using an alumina substrate, the braze material being Ag and the braze temperature being 1,000° C. In a subsequent "peel" test designed to check the adhesive strength an average bond strength of 5,000 psi was recorded before failure occurred in the brazed joint: in a tensile test failure occurred in the lead at 10,000 psi. The strength of such joints exceeds that of similar joints the connecting pads for which are made from commercially available pastes including Mo/Mn mixtures (see below), particularly in "peel" test results.

Hitherto other metallising pastes which have been used to provide highly adherent conducting elements have generally included molybdenum-manganese mixtures. These mixtures the composition of which generally approximates to 80 percent Mo:20 percent Mn require that the pastes in which they are included be fired in a controlled atmosphere of moist hydrogen, typically for 30 mins at 1,500° C. Apart from the disadvantages of requiring a controlled atmosphere, a higher firing temperature and a longer firing time, compared with the air-firing pastes of the invention, the elements thus formed do not readily accept solders or brazes, as do the fired pastes of the invention, and a layer, usually of Ni or Cu, must be deposited thereon as intermediary material.

Due to the well-known migration of Ag ions in electrical fields in conditions of high humidity, resulting in the shorting of circuitry, it is preferable to use Au or Au alloy powder in the present metallising pastes for applications where high humidity prevails.

We claim:

1. A method for forming an electrically conducting element on a ceramic substrate comprising forming a replica of said element on said substrate using a metallising paste consisting essentially of a heat-vaporizable inert liquid medium containing, in powder form, at least one constituent selected from the group consisting of a noble metal, an alloy of a noble metal, an oxide of a noble metal and an oxide of a noble metal alloy in amounts not less than 40 percent by wt., at least one constituent selected from the group consisting of copper and copper oxide in amounts ranging from 1 to 50 percent of Cu by wt., and a vitreous binder, said binder having a fusion temperature less than the melting temperature of the noble metal — copper oxide alloy formed on fusing the powder constituents of the paste and being present in amounts up to 10 percent by wt., drying the formed replica, firing the dried replica in a non-reducing atmosphere at a temperature not less than the melting temperature of the noble metal — copper oxide alloy and solidifying the fired replica to form said conducting element.

2. A method according to claim 1 in which the replica is formed by screen-printing.

3. A method according to claim 1 in which the dried replica is fired at not less than the melting temperature of the noble metal constituent.

4. A method according to claim 2 in which the dried replica is fired at not less than the melting temperature of the noble metal constituent.

5. A ceramic substrate having an electrically conducting element formed thereon by a method according to claim 1.

6. A ceramic substrate having an electrically conducting element formed thereon by a method according to claim 2.

* * * * *